(12) United States Patent
Feller et al.

(10) Patent No.: US 10,601,785 B2
(45) Date of Patent: Mar. 24, 2020

(54) OBSCURING INTERNET SEARCHES FROM EXTERNAL WEB SERVICE PROVIDERS

(71) Applicant: International Business Machines Corporation, Armonk, NY (US)

(72) Inventors: John A. Feller, Cary, NC (US); Hank Ibell, Morrisville, NC (US); William Lucy, Durham, NC (US); Joseph Marrero Corchado, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/850,557

(22) Filed: Dec. 21, 2017

(65) Prior Publication Data

US 2019/0149522 A1    May 16, 2019

Related U.S. Application Data

(63) Continuation of application No. 15/813,450, filed on Nov. 15, 2017.

(51) Int. Cl.
*G06F 16/9535* (2019.01)
*G06F 16/9538* (2019.01)
(Continued)

(52) U.S. Cl.
CPC .... *H04L 63/0407* (2013.01); *G06F 16/24534* (2019.01); *G06F 16/9535* (2019.01); *G06F 16/9538* (2019.01); *H04L 63/0281* (2013.01)

(58) Field of Classification Search
CPC .................. G06F 16/95; G06F 16/951; G06F 16/953–16/9538
See application file for complete search history.

(56) References Cited

U.S. PATENT DOCUMENTS 6,243,710 B1    6/2001    DeMichiel et al.
6,269,368 B1    7/2001    Diamond
(Continued)

FOREIGN PATENT DOCUMENTS

WO        9933003 A1    7/1999

OTHER PUBLICATIONS

Zhou, Qi et al., "SPARK: Adapting Keyword Query to Semantic Search", ISWC/ASWC 2007, LNCS 4825, pp. 694-707, 2007.
(Continued)

*Primary Examiner* — Daniel B Potratz
(74) *Attorney, Agent, or Firm* — Michael P. O'Keefe; Madeline F. Schiesser; Keohane & D'Alessandro PLLC

(57) ABSTRACT

Approaches presented herein enable obscuring a query from an external web service provider. More specifically, a user-submitted query is split into at least two non-identical, secondary search queries. The non-identical search queries are submitted to an external web services provider separately, at different times spread throughout a search timeframe, from different virtual locations, thereby obscuring the original search query from the external web services provider. An internal system receives and merges the search results of the non-identical secondary queries from the external web services provider. The internal system then performs a second search on the merged results using the original user-submitted search query to find the results within the merged results that are most relevant to the original query. These relevant results are then presented to the user.

18 Claims, 4 Drawing Sheets

(51) Int. Cl.
*H04L 29/06* (2006.01)
*G06F 16/2453* (2019.01)

(56) References Cited

U.S. PATENT DOCUMENTS

| | | |
|---|---|---|
| 6,564,261 B1 | 5/2003 | Gudjonsson et al. |
| 7,337,163 B1 | 2/2008 | Srinivasan et al. |
| 8,126,870 B2 | 2/2012 | Chowdhuri et al. |
| 2007/0220268 A1 | 9/2007 | Krishnaprasad et al. |
| 2010/0023509 A1* | 1/2010 | Adachi ............... G06F 16/951 707/E17.014 |
| 2011/0119253 A1* | 5/2011 | Grabarnik .......... G06F 21/6227 707/722 |
| 2015/0039579 A1* | 2/2015 | Clark ................ G06F 16/9535 707/706 |
| 2017/0195365 A1* | 7/2017 | Basson .............. H04L 63/0428 |

OTHER PUBLICATIONS

Unknown, "Performing Client Side Dynamic Query Splitting", IP.Com, IPCOM000231460D, Sep. 30, 2013, 4 pgs.

Chang, Yan-Cheng et al., "Privacy Preserving Keyword Searches on Remote Encrypted Data", Proceeding ACNS'05, Jun. 2005, pp. 442-455.

Potratz, Daniel B., U.S. Appl. No. 15/813,450, Office Action dated Sep. 25, 2019, END820161490US01, 18 pgs.

Potratz, Daniel B., U.S. Appl. No. 15/813,450, Notice of Allowance dated Nov. 14, 2019, 14 pgs.

* cited by examiner

US 10,601,785 B2

OBSCURING INTERNET SEARCHES FROM EXTERNAL WEB SERVICE PROVIDERS

The present patent document is a continuation of U.S. patent application Ser. No. 15/813,450, filed Nov. 15, 2017, entitled "OBSCURING INTERNET SEARCHES FROM EXTERNAL WEB SERVICE PROVIDERS", the disclosure of which is incorporated herein by reference.

TECHNICAL FIELD

The present invention relates generally to web search services and, more specifically, to obscuring an intended search from an external web service provider.

BACKGROUND

Use of services offered by web service providers is ubiquitous. Particularly, search engine tools offered by web service providers are an invaluable resource to both individuals and enterprises alike. Some of the most popular search engines include Google, Bing, and Yahoo! (Google is a registered trademark of Google Inc.; Bing is a registered trademark of Microsoft Corporation; Yahoo! is a registered trademark of Yahoo Inc.). In addition to offering general search engines, some service providers also offer search tools tailored to a specific field, such as Google Maps and Google Patents. Web service providers, however, are in a position to monitor and keep records of all activity enacted through their services, including entered text, IP (Internet Protocol) addresses, and even user identities. This allows web service providers to collect information from individuals who are using their web services, regardless of whether the person wishes to share that information. Even if a person can obfuscate his or her identity, for example by concealing his or her IP address with a Virtual Private Network (VPN), a web service provider or website service owner can still learn and infer much information simply by monitoring web form input.

SUMMARY

Approaches presented herein enable obscuring a query from an external web service provider. More specifically, a user-submitted query is split into at least two non-identical secondary search queries. The non-identical search queries are submitted to an external web services provider separately, at different times spread throughout a search timeframe, from different virtual locations, thereby obscuring the original search query from the external web services provider. An internal system receives and merges the search results of the non-identical secondary queries from the external web services provider. The internal system then performs a second search on the merged results using the original user-submitted search query to find the results within the merged results that are most relevant to the original query. These relevant results are then presented to the user.

One aspect of the present invention includes a method for obscuring a query from an external web service provider, comprising: splitting a primary search query into at least two non-identical secondary search queries; submitting the at least two secondary search queries separately to the external web services provider at different times spread throughout a search timeframe for the primary search query; merging a received plurality of secondary search result sets, each secondary search result set corresponding to one of the at least two secondary search queries; searching the merged plurality of secondary search result sets using the primary search query to find a set of primary search results corresponding to the primary search query; and providing a user with the found set of primary search results.

Another aspect of the present invention includes a computer system for obscuring a query from an external web service provider, the computer system comprising: a memory medium comprising program instructions; a bus coupled to the memory medium; and a processor, for executing the program instructions, coupled to a obscured queries engine via the bus that when executing the program instructions causes the system to: split a primary search query into at least two non-identical secondary search queries; submit the at least two secondary search queries separately to the external web services provider at different times spread throughout a search timeframe for the primary search query; merge a received plurality of secondary search result sets, each secondary search result set corresponding to one of the at least two secondary search queries; search the merged plurality of secondary search result sets using the primary search query to find a set of primary search results corresponding to the primary search query; and provide a user with the found set of primary search results.

Yet another aspect of the present invention includes a computer program product for obscuring a query from an external web service provider, the computer program product comprising a computer readable hardware storage device, and program instructions stored on the computer readable hardware storage device, to: split a primary search query into at least two non-identical secondary search queries; submit the at least two secondary search queries separately to the external web services provider at different times spread throughout a search timeframe for the primary search query; merging a received plurality of secondary search result sets, each secondary search result set corresponding to one of the at least two secondary search queries; search the merged plurality of secondary search result sets using the primary search query to find a set of primary search results corresponding to the primary search query; and provide a user with the found set of primary search results.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
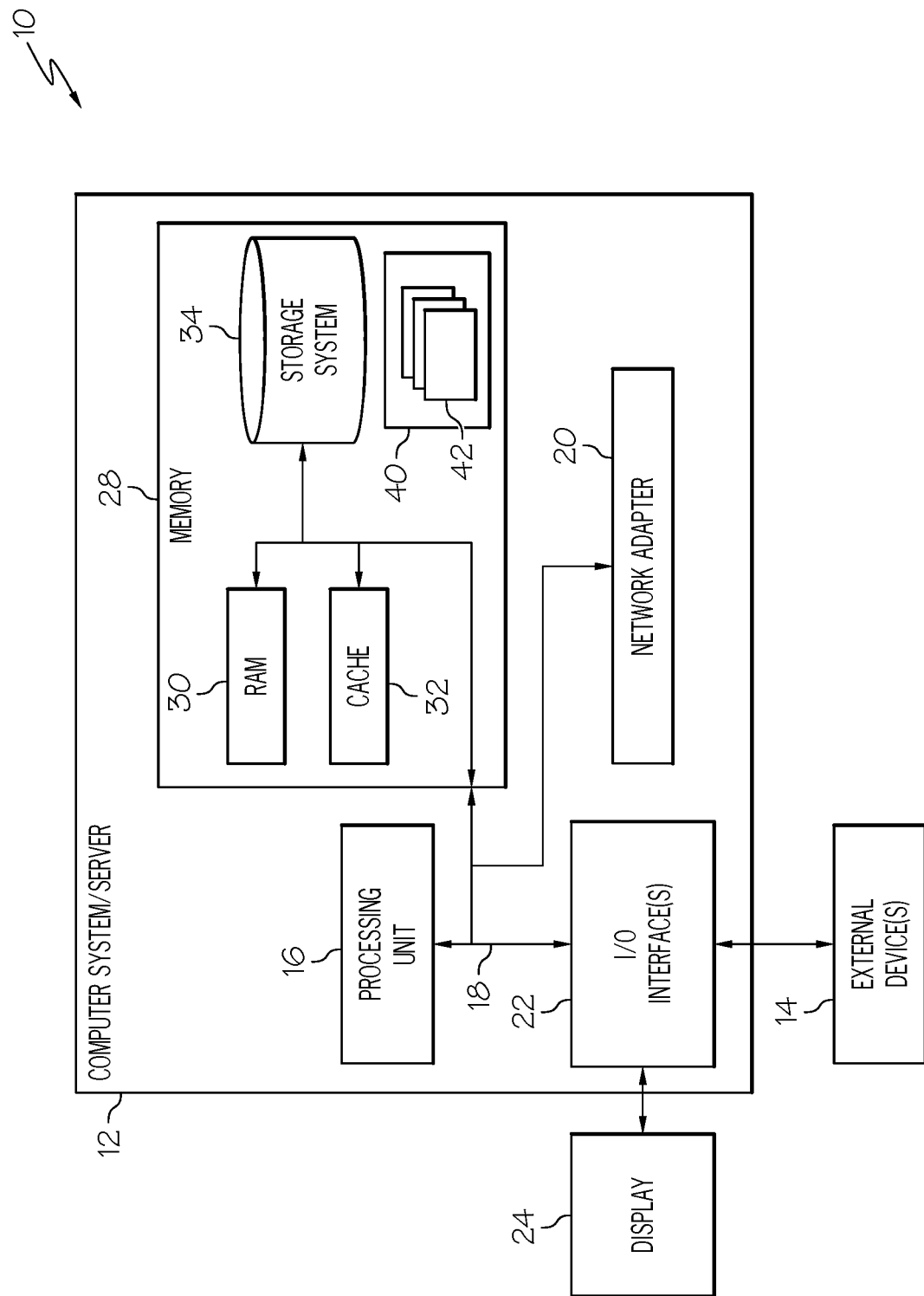
FIG. 1 shows an architecture in which the invention may be implemented according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for obscuring a query from an external web service provider. More specifically, a user-submitted query is split into at least two non-identical, secondary search queries. The non-identical search queries are submitted to an external web services provider separately, at different times spread throughout a search timeframe, from different virtual locations, thereby obscuring the original search query from the external web services provider. An internal system receives and merges the search results of the non-identical secondary queries from the external web services provider. The internal system then performs a second search on the merged results using the original user-submitted search query to find the results within the merged results that are most relevant to the original query. These relevant results are then presented to the user.

Referring now to FIG. 1, a computerized implementation 10 of an embodiment for obscuring confidential queries from an external web services provider will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for obscuring confidential queries from an external web services provider. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for obscuring confidential queries from an external web services provider, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that external web service providers are able to collect information from users who use the external web providers' web services. This information can be very detailed, and in some instances can include an actual identity of a user, his/her physical location or address, his/her IP address, a history of every interaction he or she has taken with an external web provider's web services, as well as any current interactions with the web services. Even if a computer system operated by the user is configured to hide some of this information (e.g., by using a VPN), a web site or web service owner can nevertheless infer a significant amount of information just by monitoring web form input.

For example, many inventors use patent search databases, such as Google Patents, to look for prior art before pursuing a patent. However, if someone working at a company operating such a search service has the opportunity to collect and review various queries and associate the queries with a particular user, then that person could learn and infer knowledge about the inventor's invention. This might allow the person to have competitive information about the invention or permit him/her to learn enough about the invention to submit a patent application before the original inventor does so.

There are also further cases where the user of a web service may wish to obscure his or her search query or other user input from the corresponding web service provider. For instance, when conducting legal research, a user may wish to obscure the details of his or her search in order to protect information shared under attorney-client confidentiality. In another instance, a user working for the government or a law enforcement agency may use a web service provider to gather information for an investigation, but may not want to risk information about the investigation leaking to the public. Other areas in which it may be desirable to hide a search query or other user input include, for example, market research and databases of external organizations, such as government records.

Accordingly, the inventors of the present invention have developed a system that obscures confidential queries from an external web services provider, such as social networks, advertisers, and search engines. Embodiments of the present invention can split queries in to keywords that are then searched at different times, at different virtual locations, and/or under different identities or client identifiers. Submission of the sections of the split queries are further spread throughout a user desired time frame or a recommended time frame based on the amount of terms to be searched. Results for each of the sections of the split queries are mined, returned to a local system, and correlated. The local system performs a final search on the aggregated results using all terms of the original query to produce completed search results.

Embodiments of the present invention offer several advantages for obscuring confidential queries from an external web services provider. For example, embodiments can be used to help to prevent an external entity from learning the intent and content of a query. This helps to protect confidential information from being shared with the external entity or from being pieced together by the external entity and used by the external entity, possibly in a way that is harmful to the person submitting the query. Furthermore, embodiments help to prevent the information submitted to or received from the external entity from being associated with the person submitting the query, which may be undesirable for some people or organizations. Accordingly, embodiments of the present invention offer the advantages of helping to protect user-submitted query information from being fully known to and correlated by external entities.

Figure 2:
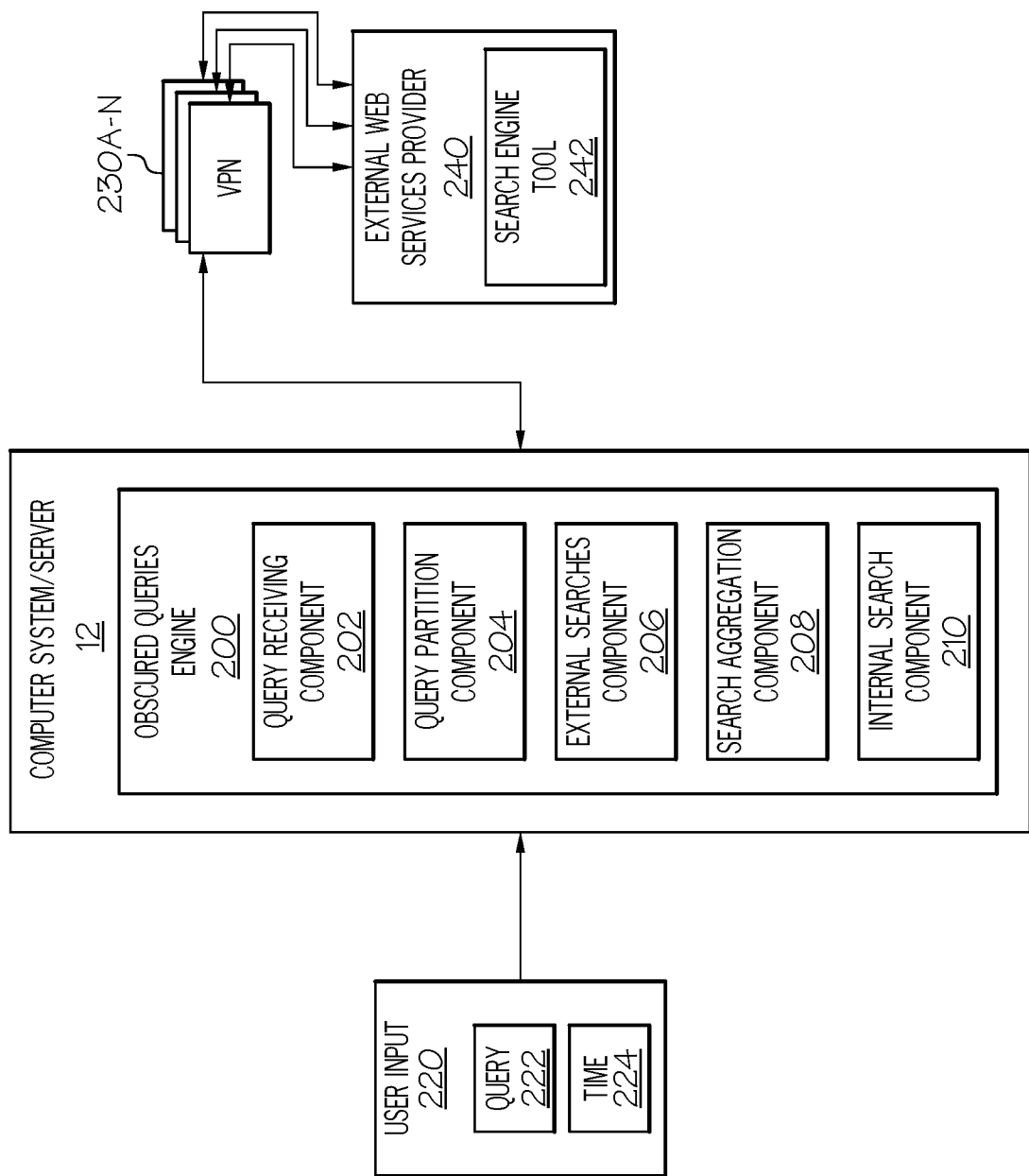
FIG. 2 shows a more detailed system diagram according to an embodiment of the present invention.

Referring now to FIG. 2, a system diagram describing the functionality discussed herein according to an embodiment of the present invention is shown. It is understood that the teachings recited herein may be practiced within any type of computing environment, including, but not limited to a networked computing environment (e.g., a cloud computing environment). A stand-alone computer system/server 12 is shown in FIG. 2 for illustrative purposes only. In the event the teachings recited herein are practiced in a networked computing environment, each client need not have an obscured queries engine 200. Rather, all or part of obscured queries engine 200 could be loaded on a server or server-capable device that communicates (e.g., wirelessly) with the clients to provide for obscuring confidential queries from an external web services provider therefor. Regardless, as depicted, obscured queries engine 200 is shown within computer system/server 12. In general, obscured queries engine 200 can be implemented as program/utility 40 on computer system 12 of FIG. 1 and can enable the functions recited herein.

Along these lines, obscured queries engine 200 may perform multiple functions similar to a general-purpose computer. Specifically, among other functions, obscured queries engine 200 can obscure confidential queries from an external web services provider in a networked computing environment. To accomplish this, obscured queries engine 200 can include a set of components (e.g., program modules 42 of FIG. 1) for carrying out embodiments of the present invention. These components can include, but are not limited to, query receiving component 202, query partition component 204, external searches component 206, search aggregation component 208, and internal search component 210.

Through computer system/server 12, obscured queries engine 200 can receive user input 220, such as query 222 and timeframe or time increment 224. Through one or more networks (e.g., Virtual Private Networks (VPNs) 230) accessed by computer system/server 12, obscured queries engine 200 can access and be in communication with external web services provider 240. External web services provider 240 can include search engine tool 242, specialized search engines, or other web service tools.

Figure 3:
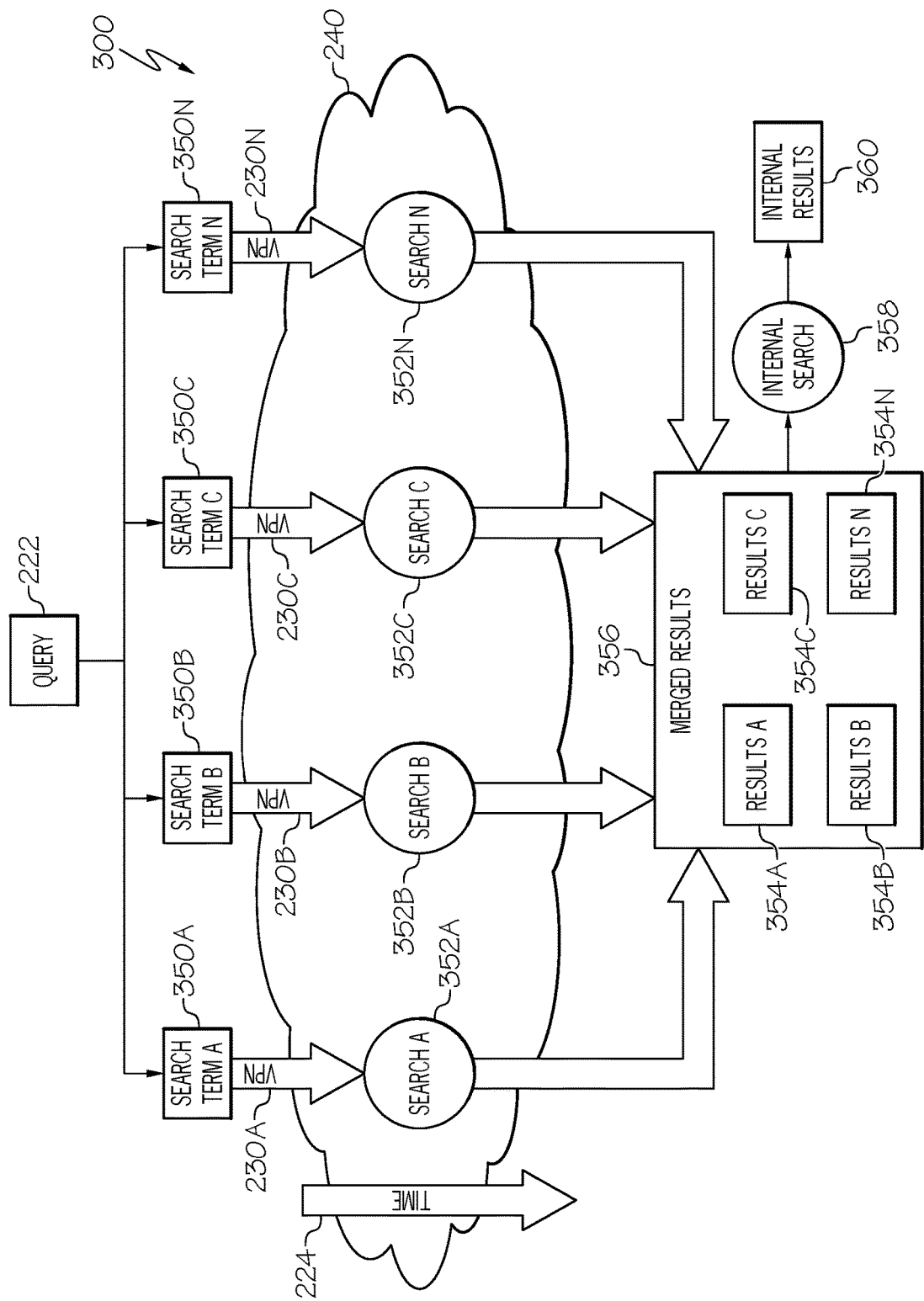
FIG. 3 shows an illustrative example of obscuring confidential queries from an external web services provider according to an embodiment of the present invention.

Referring now to FIG. 3 in connection with FIG. 2, an illustrative example of obscuring confidential queries from an external web services provider is shown. When a user wishes to perform a search or other action requiring the entering of text through an external web services provider, but does not wish to disclose to the external web services provider the full content of the search query, he or she may employ obscured queries engine 200 of embodiments of the present invention. In some embodiments, query receiving component 202 of obscured queries engine 200, as performed by computer system/server 12, can receive user input 220 from the user. This user input 220 includes at least primary query 222 of the user and may, in some embodiments, also include timeframe 224. Timeframe 224 is an indication of how long the user is willing to wait for or how fast the user wants returned results from search query 222.

For example, a user wants to search for patents in a government website database system related to an invention he has made. However, the user is concerned that external entities, advertisement services, or other companies may be able to track and view searches of the system. Therefore, he will use obscured queries engine 200 of the present invention to perform the search for him. Query receiving component 202 can receive from the user query 222 (e.g., "flying perpetual motion machine") and time 224 (e.g., eight hours) the user is willing to wait for the results of the search query.

In some embodiments, query partition component 204 of obscured queries engine 200, as performed by computer system/server 12, splits query 222 into a plurality (i.e., at least two) of secondary search queries 350A-N. This division may be based on balancing factors, such as timeframe 224 (e.g., a longer timeframe 224 allows for smaller, more numerous secondary search queries 350A-N, while a shorter timeframe 224 would likely require fewer, more detailed secondary search queries 350A-N). For instance, as time will also be needed to complete an internal search once external searches are finished, the internal search time may act as an upper bound on the amount of time permitted for external searches during time frame 224, thereby limiting the number of external searches that can be completed.

Another balancing factor on which the division may also or alternatively be based is the context of query 222. For instance, it may be desirable to keep together search terms that have a specific meaning when associated together, but that have a different or irrelevant meaning when separated. In other instances, it may be desirable to separate terms that would provide an external party with too much information if kept together. In order to determine whether two or more search terms have a special meaning when combined or would provide too much information if kept together, query partition component 204 can apply natural language processing to query 222. Query partition component 204 can use this natural language processing to identify common phrases in query 222. Query partition component 204 can then assess whether any of these identified phases pose a risk of divulging information (e.g., based on a threshold significance of the phrase within query 222 using topic analysis) and should therefore be separated or are important for search context and therefore should be kept together. In the case of the former, query partition component 204 can then separate words of an identified phrase into different secondary search queries 350A-N. In the case of the latter, query partition component 204 can then place the words of the identified phrase into a same secondary search query 350N. For example, the natural language processing feature of query partition component 204 can identify "perpetual motion" in query "perpetual motion flying machine" as a common phase and can determine that this phrase is highly significant within the query and therefore, if searched as a whole phrase, would pose a risk of divulging information an external web search provider.

Yet another balancing factor on which the division may also or alternatively be based is a balance between the risk of an external party successfully reverse-engineering original query 222 versus the promptness of results. This balancing may be accomplished by calculating a risk of determining original query 222 from a particular set of secondary search queries 350A-N (e.g., based on historic data or other machine-learning techniques). Query partition component 204 can compare the calculated risk factor against a threshold (e.g., set by a user or query partition component 204) in which an acceptable risk increases the longer the search of secondary search queries 350A-N is predicted to take. Accordingly, a riskier set of secondary search queries 350A-N may be permitted to be searched. In some instances, several secondary search queries 350A-N can contain redundancies with other queries of secondary search queries 350A-N, which may affect a risk associated with those queries or a time it will take to search them.

In other embodiments, query partition component 204 can create several sets of secondary search queries 350A-N and estimate a time needed to safely search each set. These alternative sets of secondary search queries 350A-N and requisite search times can also be based on a balancing factor such as a balance between the risk of an external party successfully reverse-engineering original query 222 versus the desire to have prompt results. Query partition component 204 can then receive an indication (e.g., from a user) of which set of secondary search queries to search (e.g., based on the time it will take for results to be returned to him). Alternatively or additionally, query partition component 204 can then receive (e.g., from a user) a modification to one or more of the set of secondary search queries and an approval to search the modified secondary search queries.

In still other embodiments, a user may instruct query partition component 204 how the user would like query 222 divided. In response, query partition component 204 can then inform user of how long a search on the divided query would likely take or determine whether it is feasible to perform the user requested secondary search in timeframe 224 requested by the user. This time estimate and feasibility determination can be based on historical data of previous similar searches saved in a data repository or other precedent information. The user may accept or reject the proposed search based on the time determination of query partition component 204.

Returning now to the illustrative example discussed above, query partition component 204 divides query 222 (i.e. "flying perpetual motion machine") into several different sets of secondary search queries 350A-N (e.g., Option A—"flying perpetual," "flying motion," and "machine"; or Option B—"flying," "perpetual," "motion," and "machine") each requiring an estimated timeframe 224 for completion (e.g., six hours; or eight hours, respectively). Query partition component 204 does not offer a secondary search query 350N containing "perpetual, motion, and machine" because query partition component 204 determines that there is too great a risk of an external party learning from such a search query. Option A of secondary search queries 350A-N offers the advantage of a shorter turnaround time, while Option B of secondary search queries 350A-N offers the advantage of better obscuring of query 222. Therefore, these options and their advantages can be presented to a user for his or her selection.

Once secondary search queries 350A-N are determined, external search component 206 of obscured queries engine 200, as performed by computer system/server 12, submits secondary search queries 350A-N separately to external web services provider 240 within timeframe 224. To accomplish this, external search component 206 schedules/initiates a separate search for each secondary search query 350N of secondary search queries 350A-N at different times from one another during timeframe 224. It should be understood that external search component 206 schedules the searches within timeframe 224 so as to also permit time for an internal search, discussed in more detail below, within timeframe 224. In an embodiment, at each scheduled time during timeframe 224 for each secondary search query 350N, external search component 206 creates a VPN connection 230N (or other obscuring technique, such as using different servers or using multiple proxies) to a different endpoint (e.g., network A, network B, . . . network N). Obscured behind VPN connection 230N (or another obscured network connection), external search component 206 submits secondary search query 350N to external web services provider 240 from different network locations and/or virtual locations. Accordingly, to external web services provider 240, each of the search queries 350A-N appears to originate from different machines across different regions. In some embodiments, external search component 206 can also or alternatively use different identities or client identifiers when submitting search query 350N to external web services provider 240. Accordingly, at each of the scheduled times during timeframe 224. external web services provider 240 (e.g., using search engine tool 242 of the like) performs one of external searches 352A-N. To external web services provider 240, these external searches 352A-N appear to be unrelated as they do not share a same submission time, virtual or network location, and/or identity or identifier. In some embodiments, two or more different external web services providers 240 can be used to further scatter the components of query 222.

Returning now to the illustrative example discussed above, external search component 206 schedules and submits secondary search queries 350A-N to external web services provider 240 at different, staggered times during timeframe 224 through different VPN connections 230A-N (e.g., submit "flying perpetual" at time 00:20:55 through VPN 1 having virtual endpoint ABC, "flying motion" at time 03:46:54 through VPN 2 having network endpoint DEF, and "machine" at time 04:27:15 through VPN 3 having endpoint GHI during a 6-hour timeframe).

As external search component 206 receives external secondary results 354A-N of external searches 352A-N through VPN connections 230A-N, search aggregation component 208 of obscured queries engine 200, as performed by computer system/server 12, can merge the received secondary external search result sets 354A-N. To accomplish this, search aggregation component 208 can store external secondary results 354A-N locally, such as within storage system 34 of computer system/server 12 or another local virtual or network storage location in communication with computer system/server 12. Search aggregation component 208 can store external secondary results 354N locally immediately after external search 352N is completed or towards the end of timeframe 224 with other external secondary results 354A-N. Search aggregation component 208 can aggregate, cumulate, and/or correlate all results of external secondary results 354A-N locally as merged results 356. These cumulative results 356 may be organized randomly or using any methodology now known or later developed to order search results, such as relevance to secondary search queries 350A-N or recentness. In some embodiments, search aggregation component 208 can create a map of all strings, documents, and other external secondary results 354A-N received. This string mapping can be used to identify which documents among external secondary results 354A-N have a highest hit percentage and therefore are most likely to have a high match with original query 222.

Returning to the illustrative example discussed above, search aggregation component 208 receives results 354A from a first search (e.g., 10,234 documents at time 00:25:01 through VPN 1) and stores results 354A in storage 34 (FIG. 1). Search aggregation component 208 does the same for results 354B and 354C. Search aggregation component 208 merges results 354A-C and may create a mapping showing relationships between the merged results 354A-C as a whole.

Internal search component 210 of obscured queries engine 200, as performed by computer system/server 12, searches merged plurality of secondary search result sets 356 using primary search query 222 to find set of primary search results 360 corresponding to primary search query 222. To accomplish this, internal search component 210 performs an internal, in-house search 358 on merged results 356 using original query 222. In some embodiments, internal search component 210 can begin to search one or more secondary search result sets 356 before all secondary search result sets 356 are merged to remove erroneous results (in light of primary search query 222) or to give priority to relevant search results (in light of primary search query 222), thereby reducing the storage space ultimately required to store merged results 356.

Internal search 358 effectively acts as the search that external web services provider 240 would have performed had query 222 been directly submitted to external web services provider 240. Accordingly, internal search component 210 can use any searching technique and algorithm now known or later discovered to search merged results 356. In some embodiments, internal search component 210 can run internal search 358 on a powerful, internal cognitive system, such as IBM's Watson Search or Watson Explorer (IBM is a registered trademark and Watson is a trademark of International Business Machines Corporation). Internal search component 210 can use such a cognitive system to match query 222 to some of the results in merged results 356 and determine which of merged results 356 are most relevant to query 222. Internal search component 210 can also use the cognitive search system to remove erroneous results from merged results 356 that, when compared to the entirety of query 222, are unrelated to query 222. Based on internal search 358, internal search component 210 can order merged results 356 according to relevancy to query 222. According to embodiments of the present invention, internal search 358, in addition to external searches 352A-N, is completed within timeframe 224 requested by the user.

Returning to the illustrative example discussed above, internal search component 210 reviews the combined merged results of searches 352A, 352B, and 352C on a powerful in-house cognitive computing system using original query 222 (e.g., "flying perpetual motion machine"). As the in-house system searches through merged results 356, internal search component 210 removes results which are not relevant (e.g., aerial refueling, flight mechanics), while ranking relevant results according to relative relevancy (e.g., perpetual motion machine prototypes, flying machines) based on query 222.

At the end of timeframe 224 (or sooner depending on internal search 358 processing time), internal search component 210 presents internal results 360, the results of internal search 358, to the user. From the user's perspective, internal results 360 are essentially the same results the user would have received had he directly submitted query 222 to external web services provider 240. However, because query 222 was submitted through obscured queries engine 200, external web services provider 240 remains unaware of query 222. Accordingly, embodiments of the present invention may obscure material a user wishes to search from external entities that could otherwise be tracking user queries.

Figure 4:
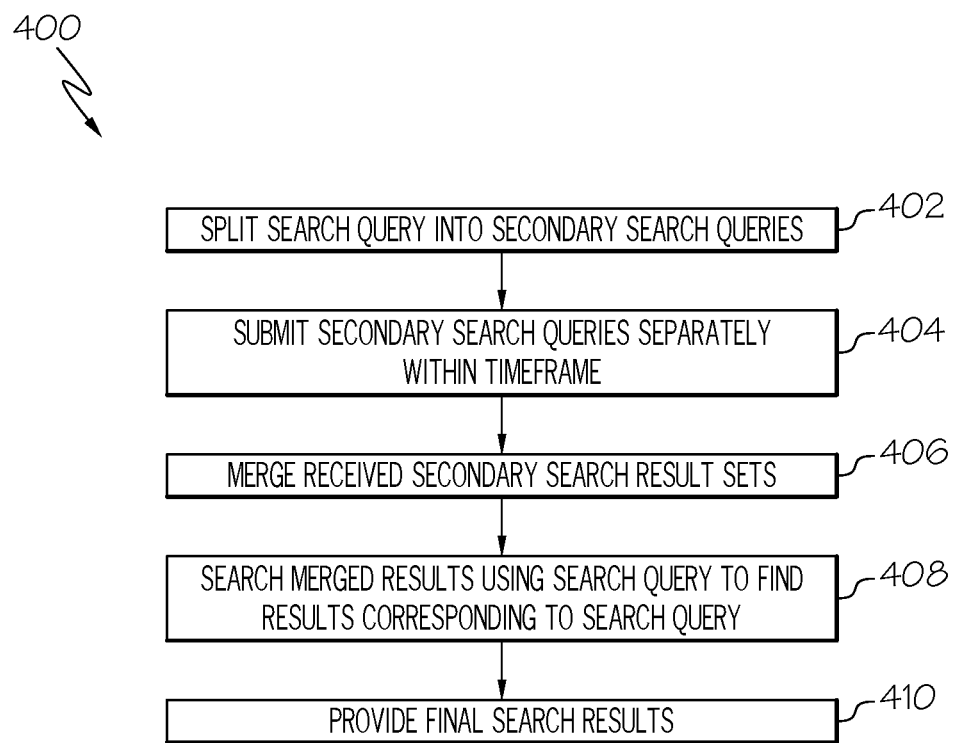
FIG. 4 shows an example process flowchart according to an embodiment of the present invention.

As depicted in FIG. 4, in one embodiment, a system (e.g., computer system/server 12) carries out the methodologies disclosed herein. Shown is a process flowchart 400 for obscuring a query from an external web service provider. At 402, query partition component 204 splits a primary search query 222 into at least two non-identical secondary search queries 350A-N. At 404, external searches component 206 submits the at least two secondary search queries 350A-N separately to an external web services provider 240 at different times spread throughout a search timeframe 224 for the primary search query 222. At 406, search aggregation component 208 merges 356 a plurality of secondary search result sets 354A-N received by external searches component 206, each secondary search result set 354N corresponding to one of the at least two secondary search queries 350A-N. At 408, internal search component 210 searches the merged plurality 356 of secondary search result sets 354A-N using the primary search query 222 to find a set of primary search results 360 corresponding to the primary search query 222. At 410, internal search component 210 provides a user with the found set of primary search results 360.

Process flowchart 400 of FIG. 4 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for obscuring confidential queries from an external web services provider. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for obscuring confidential queries from an external web services provider. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to obscuring confidential queries from an external web services provider. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for obscuring a query from an external web service provider, comprising:
   splitting a primary search query into a first plurality of secondary search queries and into a second plurality of secondary search queries;
   presenting a user with the first plurality of secondary search queries and the second plurality of secondary search queries;
   receiving a selection from the user of one of the first plurality of secondary search queries and the second plurality of secondary search queries;
   submitting the selected plurality of secondary search queries separately to the external web service provider at different times spread throughout a search timeframe for the primary search query;
   merging a received plurality of secondary search result sets, each secondary search result set corresponding to one query of the selected plurality of secondary search queries;
   searching the merged plurality of secondary search result sets using the primary search query to find a set of primary search results corresponding to the primary search query; and
   providing the user with the found set of primary search results.

2. The method of claim 1, the secondary search queries each comprising a subset of keywords from the primary search query, wherein each subset comprises less than all of the primary search query and differs from at least one other subset by at least one keyword.

3. The method of claim 1, the method further comprising:
   calculating a first time to search the first plurality of secondary search queries and a second time to search the second plurality of secondary search queries; and
   selecting the first plurality of secondary search queries based on the first time to search being less than the search timeframe and selecting the second plurality of secondary search queries based on the second time to search being less than the search timeframe.

4. The method of claim 1, the method further comprising:
   establishing a virtual private network (VPN) connection to a different virtual location for each of the selected secondary search queries;

submitting one of the selected secondary search queries through each of the VPN connections to the external web service provider; and receiving results of each submitted secondary search query from the external web service provider through the corresponding VPN connection.

5. The method of claim 4, the method further comprising:

scheduling each of the selected secondary search queries at different times during the maximum wait timeframe;

establishing a first VPN connection to one of the different virtual locations for a first query of the selected secondary search queries at a first scheduled time;

closing the first VPN connection after results are received for the first query of the selected secondary search queries;

establishing a second VPN connection to another of the different virtual locations for a second query of the selected secondary search queries at a second scheduled time; and closing the second VPN connection after results are received for the second query of the selected secondary search queries.

6. The method of claim 1, the method further comprising:

correlating the merged plurality of secondary search result sets with the primary search query; and ordering the merged plurality of secondary search result sets by relevance based on the correlating.

7. A computer system for obscuring a query from an external web service provider, the computer system comprising:

a memory medium comprising program instructions;

a bus coupled to the memory medium; and a processor, for executing the program instructions, coupled to a obscured queries engine via the bus that when executing the program instructions causes the system to:

split a primary search query into a first plurality of secondary search queries and into a second plurality of secondary search queries;

present a user with the first plurality of secondary search queries and the second plurality of secondary search queries;

receive a selection from the user of one of the first plurality of secondary search queries and the second plurality of secondary search queries;

submit the selected plurality of secondary search queries separately to the external web service provider at different times spread throughout a search timeframe for the primary search query;

merge a received plurality of secondary search result sets, each secondary search result set corresponding to one query of the selected plurality of secondary search queries;

search the merged plurality of secondary search result sets using the primary search query to find a set of primary search results corresponding to the primary search query; and provide the user with the found set of primary search results.

8. The computer system of claim 7, wherein the secondary search queries each comprise a subset of keywords from the primary search query, wherein each subset comprises less than all of the primary search query and differs from at least one other subset by at least one keyword.

9. The computer system of claim 7, the instructions further causing the system to:

calculate a first time to search the first plurality of secondary search queries and a second time to search the second plurality of secondary search queries; and select the first plurality of secondary search queries based on the first time to search being less than the search timeframe and select the second plurality of secondary search queries based on the second time to search being less than the search timeframe.

10. The computer system of claim 7, the instructions further causing the system to:

establish a virtual private network (VPN) connection to a different virtual location for each of the selected secondary search queries;

submit one of the selected secondary search queries through each of the VPN connections to the external web service provider; and receive results of each submitted secondary search query from the external web service provider through the corresponding VPN connection.

11. The computer system of claim 10, the instructions further causing the system to:

schedule each of the selected secondary search queries at different times during the maximum wait timeframe;

establish a first VPN connection to one of the different virtual locations for a first query of the selected secondary search queries at a first scheduled time;

close the first VPN connection after results are received for the first query of the selected secondary search queries;

establish a second VPN connection to another of the different virtual locations for a second query of the selected secondary search queries at a second scheduled time; and close the second VPN connection after results are received for the second query of the selected secondary search queries.

12. The computer system of claim 7, the instructions further causing the system to:

correlate the merged plurality of secondary search result sets with the primary search query; and order the merged plurality of secondary search result sets by relevance based on the correlating.

13. A computer program product for obscuring a query from an external web service provider, the computer program product comprising a computer readable hardware storage device, and program instructions stored on the computer readable hardware storage device, to:

split a primary search query into a first plurality of secondary search queries and into a second plurality of secondary search queries;

present a user with the first plurality of secondary search queries and the second plurality of secondary search queries;

receive a selection from the user of one of the first plurality of secondary search queries and the second plurality of secondary search queries;

submit the selected plurality of secondary search queries separately to the external web service provider at different times spread throughout a search timeframe for the primary search query;

merge a received plurality of secondary search result sets, each secondary search result set corresponding to one query of the selected plurality of secondary search queries;

search the merged plurality of secondary search result sets using the primary search query to find a set of primary search results corresponding to the primary search query; and provide the user with the found set of primary search results.

14. The computer program product of claim 13, wherein the secondary search queries each comprise a subset of keywords from the primary search query, wherein each subset comprises less than all of the primary search query and differs from at least one other subset by at least one keyword.

15. The computer program product of claim 13, the computer readable storage device further comprising instructions to:

calculate a first time to search the first plurality of secondary search queries and a second time to search the second plurality of secondary search queries; and select the first plurality of secondary search queries based on the first time to search being less than the search timeframe and select the second plurality of secondary search queries based on the second time to search being less than the search timeframe.

16. The computer program product of claim 13, the computer readable storage device further comprising instructions to:

establish a virtual private network (VPN) connection to a different virtual location for each of the selected secondary search queries;

submit one of the selected secondary search queries through each of the VPN connections to the external web service provider; and receive results of each submitted secondary search query from the external web service provider through the corresponding VPN connection.

17. The computer program product of claim 16, the computer readable storage device further comprising instructions to:

schedule each of the selected secondary search queries at different times during the maximum wait timeframe;

establish a first VPN connection to one of the different virtual locations for a first query of the selected secondary search queries at a first scheduled time;

close the first VPN connection after results are received for the first query of the selected secondary search queries;

establish a second VPN connection to another of the different virtual locations for a second query of the selected secondary search queries at a second scheduled time; and close the second VPN connection after results are received for the second query of the selected secondary search queries.

18. The computer program product of claim 13, the computer readable storage device further comprising instructions to:

correlate the merged plurality of secondary search result sets with the primary search query; and order the merged plurality of secondary search result sets by relevance based on the correlating.

* * * * *